Aug. 12, 1947.  F. A. BALLOU, JR  2,425,299
METHOD OF MAKING SOLDER FILLED JEWELRY FINDING
Filed June 21, 1944
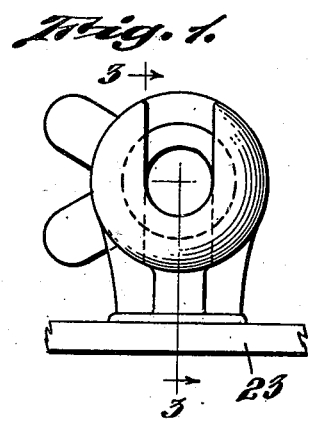
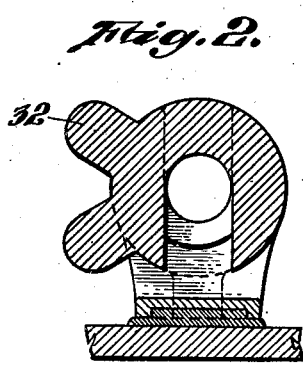
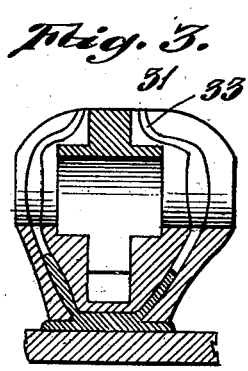
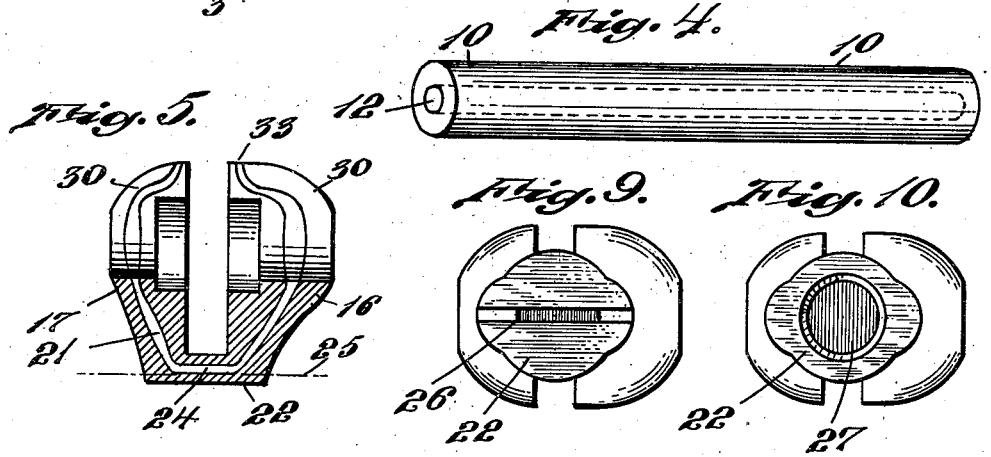
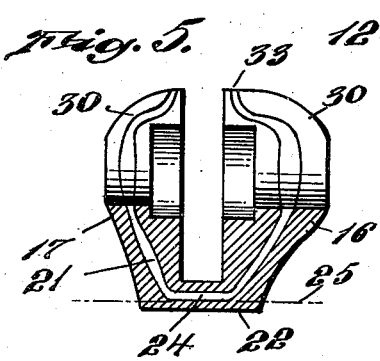
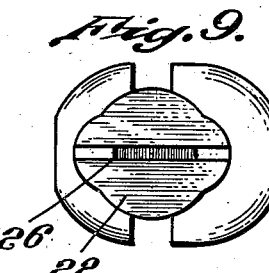
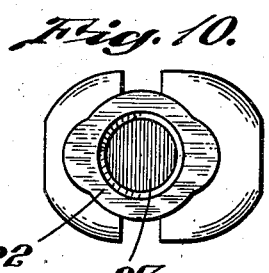
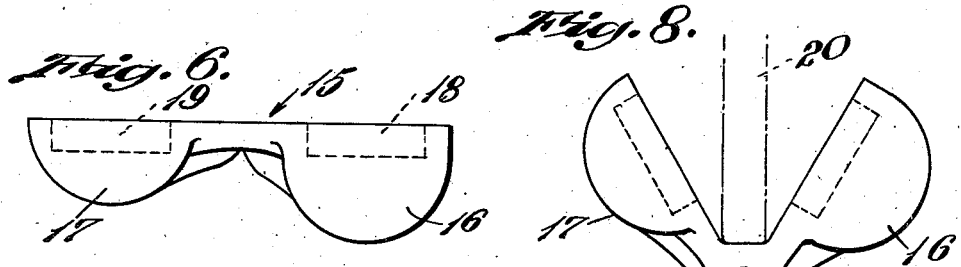
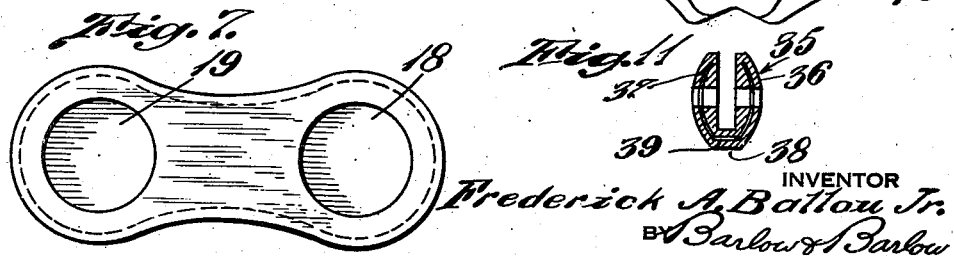
INVENTOR
Frederick A. Ballou Jr.
BY Barlow & Barlow
ATTORNEYS Patented Aug. 12, 1947

2,425,299

UNITED STATES PATENT OFFICE 2,425,299

METHOD OF MAKING SOLDER FILLED JEWELRY FINDING

Frederick A. Ballou, Jr., Providence, R. I., assignor to B. A. Ballou & Co. Incorporated, a corporation of Rhode Island Application June 21, 1944, Serial No. 541,423

3 Claims. (Cl. 29—160.6)

This invention relates to a jewelry finding, such for instance as a safety catch, pin stem joint, ear clip, pin back, button post, or the like, and particularly to the attachment of such findings to an ornament or other part with which it is to be assembled.

Jewelry findings are usually made up as a complete article and then assembled with an ornamental article by soldering the finding to the article. In the majority of attachments of this sort, solder must be added as a separate piece, either positioned initially beneath the finding or between the finding and the part to which it is to be secured, or added to the joint to be made after the parts have become heated. In either case a certain amount of skill of the solderer is required in order that the finding be attached in place in the correct relation which it is to assume. Excess solder makes a clumsy looking job and may interfere with proper alignment of the parts.

In some cases it has been proposed to make some sort of physical attachment between the solder and the finding along the surface of the finding which is to be attached to an ornament. Such physical attachments may be either mechanical or the solder may be run into a surface recess which has previously been formed.

One of the objects of this invention is to provide solder in a finding which solder is hidden beneath the finished metal but may be reached at points along the finding where desired if the solder is not already exposed by reason of the operations in tools or the like under which the finding goes for formation.

Another object of this invention is to provide a reservoir of solder extending throughout the finding which may be available for use if desired while only a small exposure need be provided for the discharge of this solder to the desired location which it is to assume.

Another object of this invention is to provide solder in a location where a minimum amount may be used.

With these and other objects in view, the invention consists of certain novel features of construction, as will be more fully described and particularly pointed out in the appended claims.

In the accompanying drawings:

Fig. 1 is an end elevation of a finding shown as a safety catch and the part to which the finding is attached;

Fig. 2 is a sectional view through both the safety catch and its attached support on line 2—2 of Fig. 3;

Fig. 3 is a sectional view taken at right angles to the section of Fig. 2 and on substantially line 3—3 of Fig. 1;

Fig. 4 is a perspective view illustrating a solder-filled wire;

Fig. 5 is a sectional view similar to Fig. 3 of one member of a safety catch which has been formed from solder-filled wire of Fig. 4;

Fig. 6 illustrates the safety catch as struck and trimmed from the wire;

Fig. 7 is a plan view of the formation shown in Fig. 6;

Fig. 8 illustrates a bending operation to provide the ears in substantially parallel relation;

Figs. 9 and 10 are bottom plan views of the base of modified form; and

Fig. 11 is a sectional view of a pin stem joint.

In proceeding with this invention I use a solder-filled wire and then form the safety catch which is illustrated in the same manner and from the same tools as were used in the formation of the catch from solid wire. The solder of the solder-filled wire except for a very minute portion at the upper edges of the catch of the shape shown herein is all enclosed and concealed within the catch. In order that the base of the catch may be attached by use of the solder which forms the body of the catch I may either remove all or part of the base or groove or notch the base or in some way provide for an exposure of the solder at the base. Then after suitable fluxing it is merely necessary to heat the surface to which attachment is to be made and also heat the safety catch that the solder may flow from the base and form an attachment of the base to the part to which it is desired the same should be secured With reference to the drawing 10 designates a solder-filled wire having a solder core 12 therein. A tubular ingot with a solder core is first formed and the wire is then drawn down to the proper size and as the drawing occurs the solder will be reduced proportionally with the diameter of the wire. Wire of the proper size is utilized in the tools for striking up and blanking out the finding which is desired. For illustration herein the finding is shown as a safety catch. The struck up and blanked out keeper member of the safety catch is designated 15 in Fig. 6 and consists of a pair of ears 16 and 17 with suitable recesses 18 and 19 therein. These ears 16 and 17 are then bent into parallel relation over a former 20 as shown in Fig. 8.

As shown in the sectional view Fig. 5, the solder which fills the catch and which is designated 21 extends along both ears 16 and 17 and also across the base designated 22. It is this base 22 which it is desired should be secured to some support or ornament designated 23 and in order to make the solder available for attachment adjacent the base 22 as shown in Fig. 5 at 24, I may remove a portion of this base along the dotted line 25 or I may groove the base as at 26 in Fig. 9 to a depth to reach this solder 24 or small opening 27 may be placed through the base as in Fig. 10 so that the solder may run out when heated.

For attachment of a safety catch thus formed with solder exposed at the base it is merely necessary to add flux and position the base on the support 23 to which it is desired the same should be secured. Then by heating the support 23 and base 22 or the entire catch it is found that the solder will run out of the catch and secure the base to the support 23. It is also found that even if the catch is heated all over that the solder rather than flowing out of the channel 21 into the portion of the slots 30, which are provided for the reception of the pin stem and which cut across the solder channel 21, the solder will stay in the channel as if drawn downwardly by a vacuum of the solder which runs out of the base of the catch and will not flow so as to secure the rotor 31 in fixed position but rather leave the rotor so that it may be manipulated by handles 32 the same as before soldering.

Minute openings illustrated in Figs. 3 and 5 at 33 which may be formed by the drawing of the solder downwardly are so small that they form no detriment to the catch. The amount of solder which is used need be very small as the same spreads readily at the joint to provide the attachment. A much better and cleaner job may be had with a catch so constituted and a substantial saving of labor is also provided. Further, less skill is needed and better alignment may be obtained, the entire operation being much easier to set up and when once in place will stay in that place until attachment is provided. Either hard or easy flowing solder may be provided in the wire at the commencement of the forming operation depending upon the solder joint which is desired for the finished article.

It will be readily apparent that any shape of solder-filled wire may be utilized whether that shape be round, rectangular, or in any other form in which the solder is entirely enveloped and exposed only at the ends of the wire except by grooving or cutting or by some other operation to reach the same within. Different shapes of wire may be better adapted to different shapes of findings. The round wire lends itself well to the shape of safety catch shown because of its outer rounded surfaces.

If it is desired to protect any of the parts against soldering the parts may be coated with a protecting material.

Other findings than a safety catch may be formed from solder-filled wire. In Fig. 11 a pin stem joint 35 is shown with ears 36 and 37 extending from a base 38. The base may have the solder 39 exposed as above described in connection with Figs. 5, 9, or 10 for making available the solder for attachment of the joint in position.

I claim:

1. The method of forming a jewelry finding which comprises providing a solder-filled wire having a solder core extending longitudinally of the wire and an encircling metal of different material, blanking and shaping from said wire a pin stem finding member having bearings for a rotor, folding said member to provide a flat base and two spaced ears with the bearings in alignment and removing some of said encircling metal at the base to expose the solder for use of the solder for attachment at this location.

2. The method of forming a jewelry finding which comprises providing a solder-filled wire having a solder core extending longitudinally of the wire and an encircling metal of different material, blanking and shaping from said wire in a lengthwise direction thereof a pin stem finding member having a bearing for a rotor, folding said member to provide a flat base and two spaced ears with bearings in alignment and removing some of said encircling metal at the base to expose the solder for use of the solder for attachment at this location.

3. The method of forming a jewelry finding which comprises providing a solder-filled wire having a solder core extending longitudinally of the wire and an encircling metal of different material, blanking and shaping from said wire in a lengthwise direction thereof a pin stem finding member having a bearing for a rotor extending across the solder core, folding said member to provide a flat base and two spaced ears with bearings in alignment and assembling during said folding a rotor in said bearings and removing some of said encircling metal at the base to expose the solder for use of the solder for attachment at this location.

FREDERICK A. BALLOU, Jr.

REFERENCES CITED

The following references are of record in the file of this patent:

UNITED STATES PATENTS

| Number | Name | Date |
|---|---|---|
| 1,635,188 | Morehouse | July 12, 1927 |
| 841,771 | Farnham | Jan. 22, 1907 |
| 2,354,409 | Strasser | July 25, 1944 |
| 1,378,501 | Wall | May 17, 1921 |
| 944,640 | Ungerer | Dec. 28, 1909 |
| 1,610,225 | Metcalf | Dec. 7, 1926 |
| 2,162,820 | Morehouse | June 20, 1939 |
| 147,053 | Fuller | Feb. 3, 1874 |